(12) United States Patent
Tabirian et al.

(10) Patent No.: US 6,678,042 B2
(45) Date of Patent: Jan. 13, 2004

(54) LASER BEAM MULTIMETER

(75) Inventors: Nelson Tabirian, Winter Park, FL (US); Sarik Nersisyan, Winter Park, FL (US)

(73) Assignee: Beam Engineering for Advanced Measurements Co., Winter Park, FL (US)

( * ) Notice: Subject to any disclaimer, the term of this patent is extended or adjusted under 35 U.S.C. 154(b) by 0 days.

(21) Appl. No.: 10/135,572

(22) Filed: May 1, 2002

(65) Prior Publication Data

US 2003/0206288 A1 Nov. 6, 2003

(51) Int. Cl.$^7$ .................................................. G01J 1/00
(52) U.S. Cl. ........................................................ 356/121
(58) Field of Search ................................ 356/121, 345, 356/353, 354

(56) References Cited

U.S. PATENT DOCUMENTS

| | | | | |
|---|---|---|---|---|
| 4,160,598 A | * | 7/1979 | Firester et al. ............... 356/121 |
| 5,042,950 A | * | 8/1991 | Salmon, Jr. .................. 356/520 |
| 5,100,231 A | * | 3/1992 | Sasnett et al. ............... 356/121 |
| 5,218,610 A | * | 6/1993 | Dixon .......................... 372/20 |
| 5,621,525 A | * | 4/1997 | Vogeler et al. .............. 356/450 |
| 6,107,617 A | * | 8/2000 | Love et al. ............... 250/201.9 |
| 6,320,663 B1 | * | 11/2001 | Ershov ......................... 356/454 |
| 6,452,145 B1 | * | 9/2002 | Graves et al. ........... 250/201.9 |

* cited by examiner

*Primary Examiner*—Michael P. Stafira

(57) ABSTRACT

The objective of the present invention is providing a method and a simple instrument that can be used on a routine basis to accurately and quickly measure the focus position, waist radius, divergence, quality, power and power density of a laser beam. The measurement is performed by scanning a thin film of a nonlinear optical material in the focal region along the propagation direction of the beam and registering the variation of the on-axis intensity of the laser beam by a photodetector.

16 Claims, 5 Drawing Sheets

LASER BEAM MULTIMETER

CROSS-REFERENCES

[1] A. E. Siegman, Lasers (University Science Books, 1986).
[2] M. Sheik-Bahae, et al., Z-scan: A simple and sensitive technique for nonlinear refraction measurements SPIE Vol. 1148 Nonlinear Optical Properties of Materials, pp. 41–51, 1989.

U.S. PATENT DOCUMENTS

| | | | |
|---|---|---|---|
| 5,100,231 | 3/1992 | Sasnett et al | |
| 4,160,598 | 7/1979 | Firester et al. | |
| 5,621,525 | 4/1997 | Tabirian et al. - | 356/345 |

STATEMENT REGARDING FEDERALLY SPONSORED RESEARCH OR DEVELOPMENT

This invention was made with Government support under SBIR Contracts No. Contract # DASG60-97-C-0053 and Contract # F33615-00-C-5409.

RIGHTS OF THE GOVERNMENT

The invention described herein may be manufactured and used by or for the Government of the United States for all governmental purposes without the payment of any royalty.

BACKGROUND OF THE INVENTION

Successful use of lasers in surgery and material processing requires precise knowledge of focus position, focused spot size, and the peak power density of the beam. In addition, the beam characterization technique shall be quick, not require thorough alignment, and shall be simple to be operated by a non-technical personal. It also has to be low cost to be incorporated into commercial laser systems.

Present-day devices for determination of focus position, focused spot size, divergence, and quality of laser beams use knife-edges, blades and slits for scanning across the beam. The transmission of the beam past the knife-edge (or any other aperture) is then monitored for characterization of the power density distribution across the beam. Several patents, such as U.S. Pat. No. 5,100,231 to Sasnett et al, U.S. Pat. No. 4,160,598 to Firester et al, describing such approaches are incorporated by references. The disadvantages of these techniques that are using knife edges and other scanning apertures is in their low accuracy and spatial resolution. They do not allow measuring waist radius of laser beams of less than 5 microns. The apertures do not withstand high power density that is achieved in the focus of laser beams used for surgery or material processing. The process of finding the focus position is highly time consuming since it requires multiple measurements in different cross-sections of the beam in the focal region. CCD can not be used for those purposes either due to their low resolution, hypersensitivity to laser radiation and low damage threshold.

One approach of overcoming the problems outlined above relies on registering the changes in the spatial profile of the beam propagated through a transparent nonlinear optical material. Such an apparatus for power density measurement of electromagnetic radiation is suggested in U.S. Pat. No. 5,621,525 to Tabirian et al., which is incorporated by reference. The technique suggested in U.S. Pat. No. 5,621,525 to Tabirian et al. provides data only about the power density of radiation.

Thus, present devices for measuring focus position, focused spot size, divergence, and quality of laser beams are not satisfactory: they have low resolution and low accuracy due to the underlying principles of measurements; measurements are time consuming; the devices are large, heavy, and expensive which do not allow their incorporation into commercial medical or industrial laser systems.

BRIEF SUMMARY OF THE INVENTION

The first objective of the present invention is to provide a technique for high-resolution and fast measurement of the focus position of focused laser beams.

The second objective of this invention is to provide means for measuring of waist radius of tightly focused laser beams.

The third objective of this invention is to provide means for fast and high-resolution measurement of divergence of laser beams.

The fourth objective of this invention is to provide simple and compact means for measurement of the quality of laser beams.

The fifth objective of this invention is to provide means for direct and high accuracy measurement of the power density of laser beams.

The sixth objective of this invention is to provide means for simultaneous high-resolution and high accuracy measurement of focus position, waist radius, divergence, beam quality, and power density of laser beams.

The invention includes focusing a laser beam, scanning a thin film of a nonlinear optical material in the focal region of the beam, and registering the changes in the intensity of the radiation at the output of the nonlinear optical material with the aid of a detector. The specific character of variation of the signal of the photodetector in time allows determination of the focus position, waist radius, and divergence of the beam with the known speed of scan. Further processing of the photodetector signal allows determination of the power density of the beam with known nonlinear optical properties of the material. Inputting the beam radius on the focusing lens allows also determination of the beam quality parameter.

Further objectives and advantages of this invention will be apparent from the following detailed description of presently preferred embodiment, which is illustrated schematically in the accompanying drawings.

DETAILED DESCRIPTION OF THE INVENTION

Before explaining the disclosed embodiment of the present invention in detail it is to be understood that the invention is not limited in its application to the details of the particular arrangement shown since the invention is capable of other embodiments. Also, the terminology used herein is for the purpose of description and not limitation.

Figure 1:
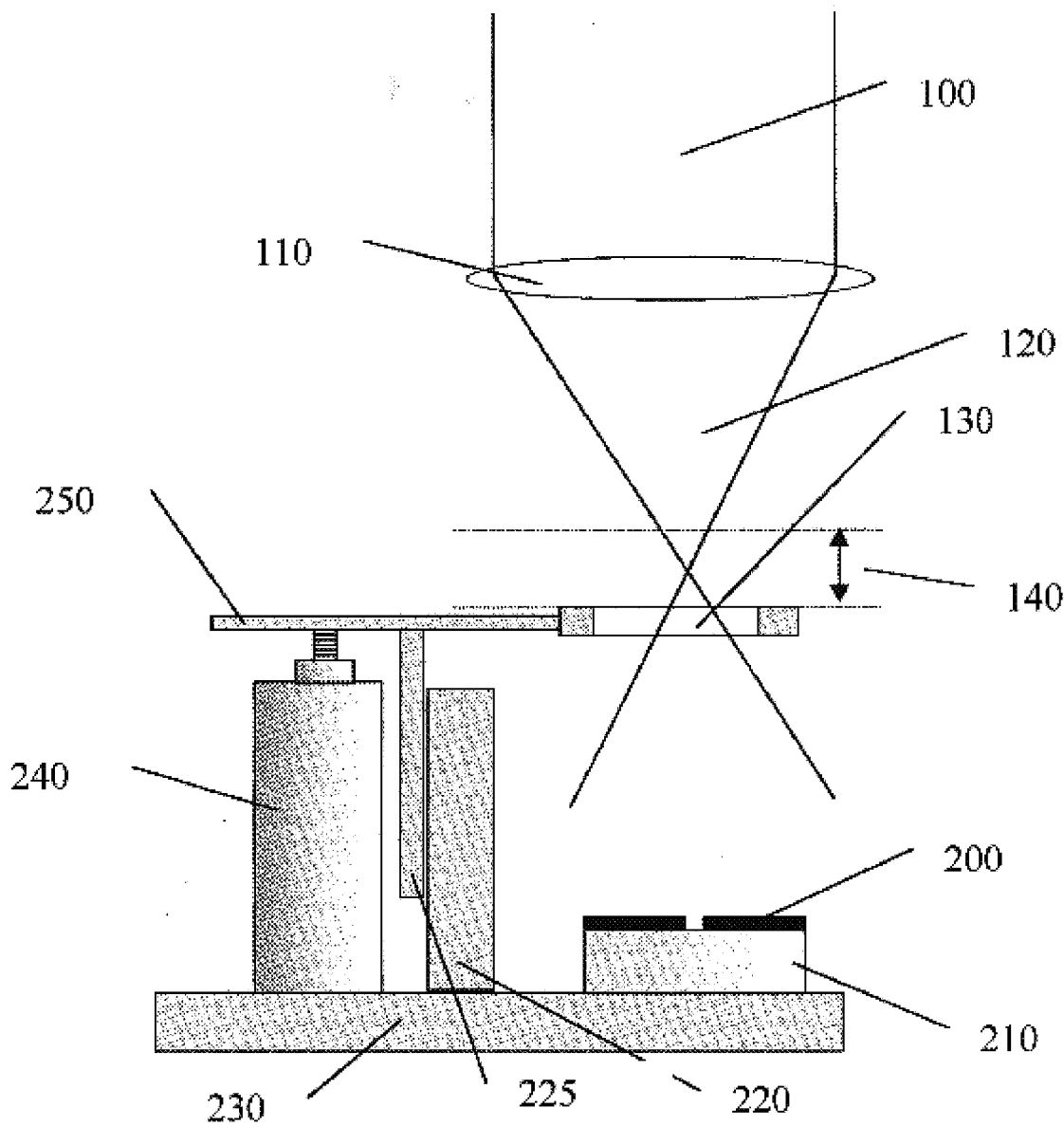
FIG. 1 shows an embodiment of the apparatus for measuring the focus position, waist radius, divergence, quality parameter and power density of a laser beam.

The present laser beam characterization method and the apparatus based on this method consists in four essential components: a thin film of a nonlinear optical material; a mechanism for moving the film in the focal region of the beam at a fixed speed; a photodetector for registering the intensity on the axis of the beam (on-axis intensity) as a function of the film position in the beam; and a data processing and display means for calculating and outputting the information about the beam parameter being measured: focus position, waist radius, divergence, beam quality parameter and the power density. Referring to the drawing of the preferred embodiment shown in FIG. 1, the laser beam multimeter consists of a thin film of a nonlinear optical material 130 mounted into a frame 250 which is fixed on the slide 225 of a motion stage 220, the latter being attached to the base of the device 230. The slide 225 is moved up and down by a motor 240. Thus the frame 250 which is housing the thin film of the nonlinear optical material 100 is being scanned through the focal region of the lens 140 which is focusing the laser beam 100. Such simplicity allows inexpensive manufacturing of the device.

Moving the nonlinear optical material 130 through the focus of the lens 110 results in changing intensity distribution of the laser beam 100 on the photodetector 210 which possesses a pinhole 200 selecting the central part of the radiation only. The signal from the photodetector is then processed and displayed with the use of a data acquisition, processing and display system such as a computer.

Figure 2:
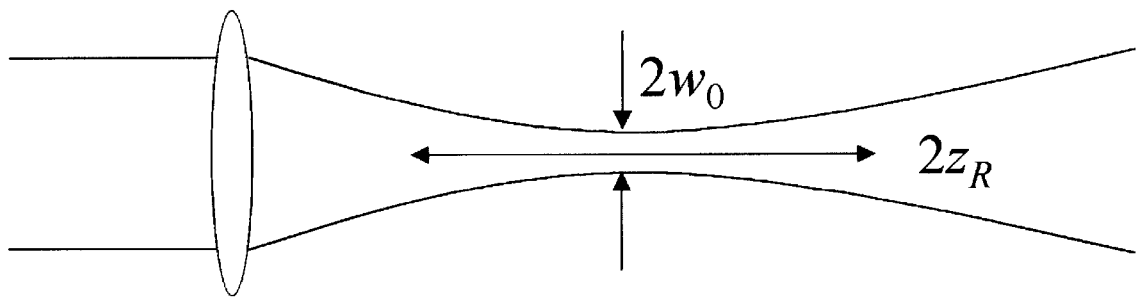
FIG. 2 shows the focal region of a laser beam. The radius of a focused laser beam $w_0$ is considerably smaller than the confocal parameter $2z_R$ (the focal region where the beam radius is smaller than $2^{1/2}w_0 \approx 1.41\ w_0$).

The method allows determination of laser beam waist radius via direct measurement of the confocal parameter (Rayleigh range) of focused laser beams, FIG. 2. The relationship between the confocal parameter $2z_R$ and the beam waist radius $w_0$ has the following form for Gaussian beams [1]:

$$z_R = \frac{\pi w_0^2}{\lambda} \quad (1)$$

Since, typically, $w_0 \gg \lambda$, we have $z_R \gg w_0$ in essentially all situations. Thus, the confocal parameter $2z_R$ (or the Rayleigh range $z_R$) can be measured easier and with higher precision to yield the beam waist radius. As an example, for near infrared radiation of wavelength $\lambda = 1.06$ $\mu$m focused to a spot radius of $w_0 = 10$ $\mu$m, the confocal parameter is 593 $\mu$m. For UV radiation of wavelength $\lambda = 0.15$ $\mu$m focused to a spot radius of $w_0 = 1$ $\mu$m, the confocal parameter is 41 $\mu$m.

Normalized variation of the intensity on the axis of a laser beam due to optical nonlinearity is described by a universal curve as a function of the position z of the nonlinear optical material in the focal region of the lens [2]:

$$T = 1 - 4\varphi_2 I_0 \frac{1}{1+(z/z_R)^2} \cdot \frac{(z/z_R)}{(z/z_R)^2 + 9} \quad (2)$$

where $\varphi_2$ is the constant of the optical nonlinearity and $I_0$ is the intensity on the axis of the incident beam.

Figure 3:
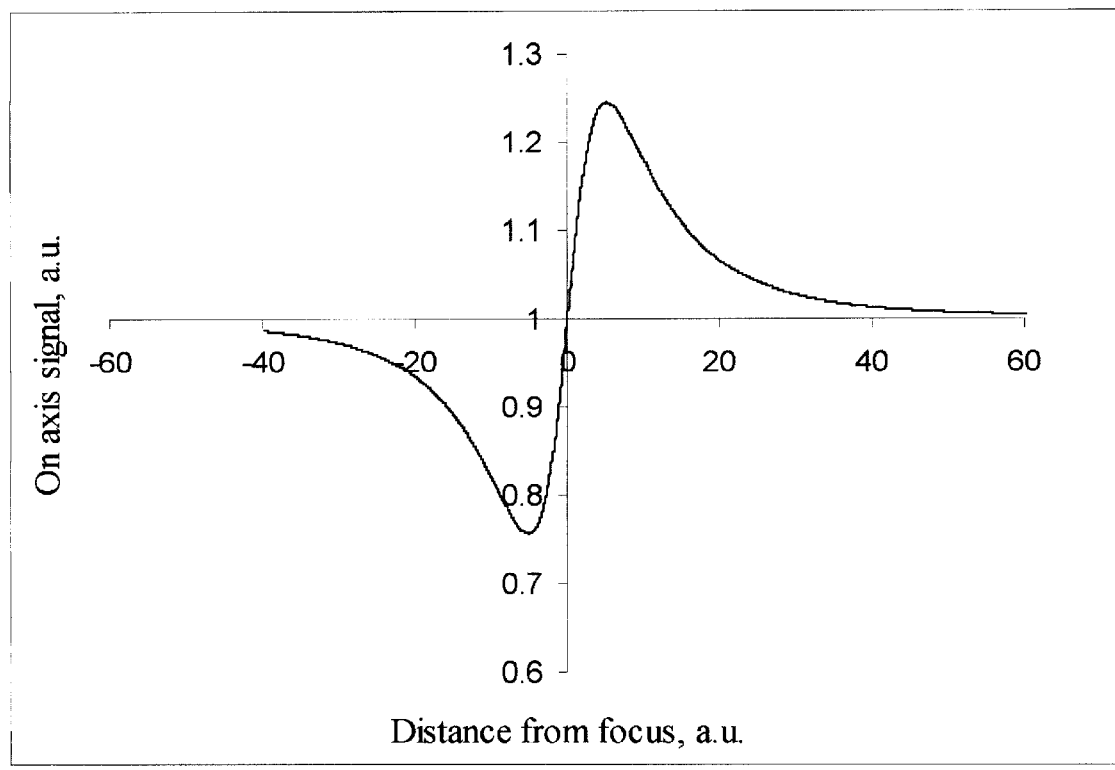
FIG. 3 shows the modulation of the on-axis intensity when scanning the nonlinear optical material in the focal region of a lens. The position of the focus is at z=0.

The curve described by the expression (2) has a well-defined peak and a valley, FIG. 3. The distance between the peak and the valley, $\Delta z$, determined with the aid of Eq. (2), is an unambiguous measure of the Rayleigh range $z_R$: $\Delta z = 1.7 z_R$. By that, the amplitude of modulation of the on-axis signal is the measure of energy/power density parameters of the beam in absolute units (determined by the material parameters of the nonlinear medium), $\Delta T_{max} = 0.4 \varphi_2 I_0$.

Figure 4:
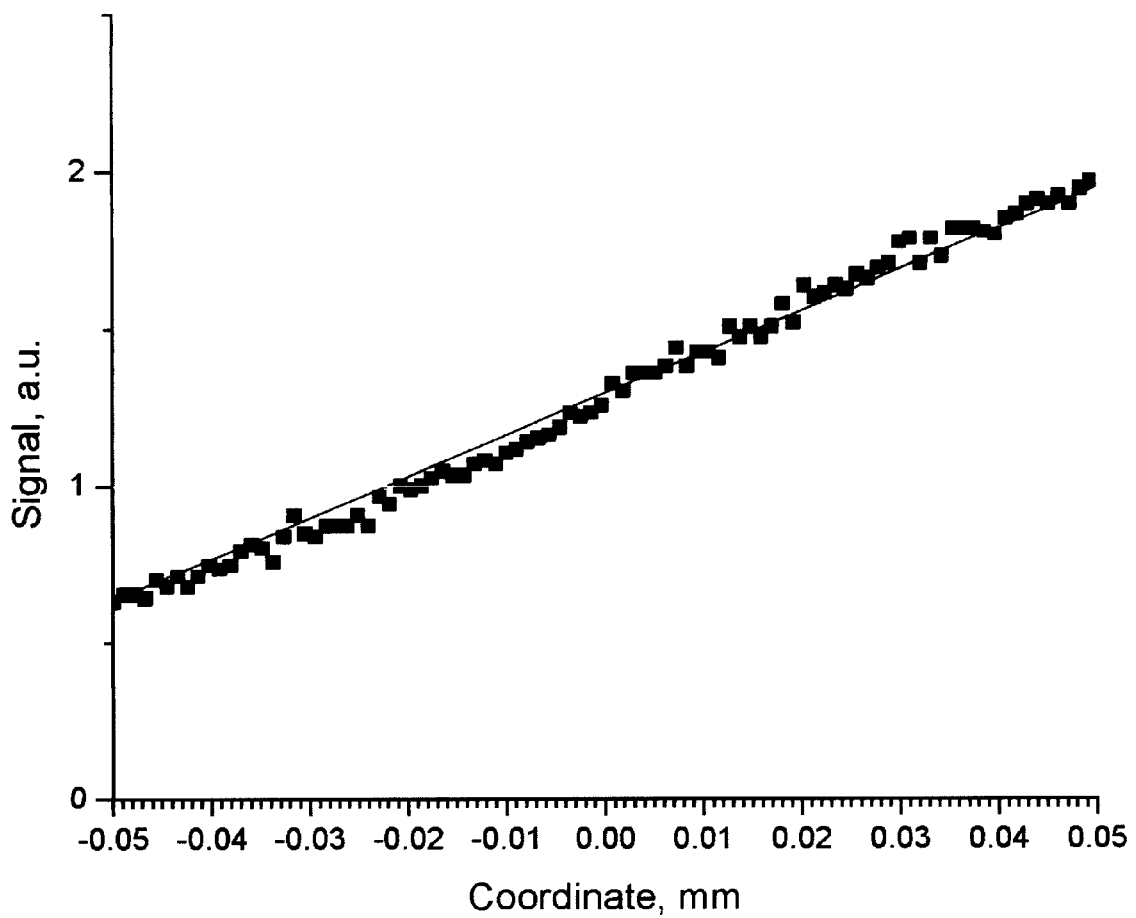
FIG. 4 shows the linear part of the signal in the focal region.

The photodetector signal changes strictly linearly when crossing the focus of the lens, which is the middle point between the valley and the peak, FIG. 4. Due to such linearity, the focus position is determined with high precision. The slope of the line in the focal region $$dT/dz = -4\varphi_2 I_0/z_R \quad (3)$$

is another important parameter which can be used for determination of the Rayleigh range and the power density of the beam with high accuracy.

While the technique of scanning nonlinear optical materials in the focal region of laser beams (z-scan) has an old history, it has been performed with calibrated laser beams for characterization of nonlinear optical properties of materials only [2]. Using the technique for characterization of laser beams requires nonlinear materials that possess with the following properties: they are thin compared to the Rayleigh range to be measured; the nonlinearity is strong in order to measure laser beams in a wide range of intensities; the laser-induced modulation of the refractive index is large to ensure measurable changes in the intensity distribution of the beam at the output of the material; the nonlinearity is not related with strong absorption of radiation. Liquid crystals are one class of such materials we have identified to combine all the features outlined above.

Figure 5:
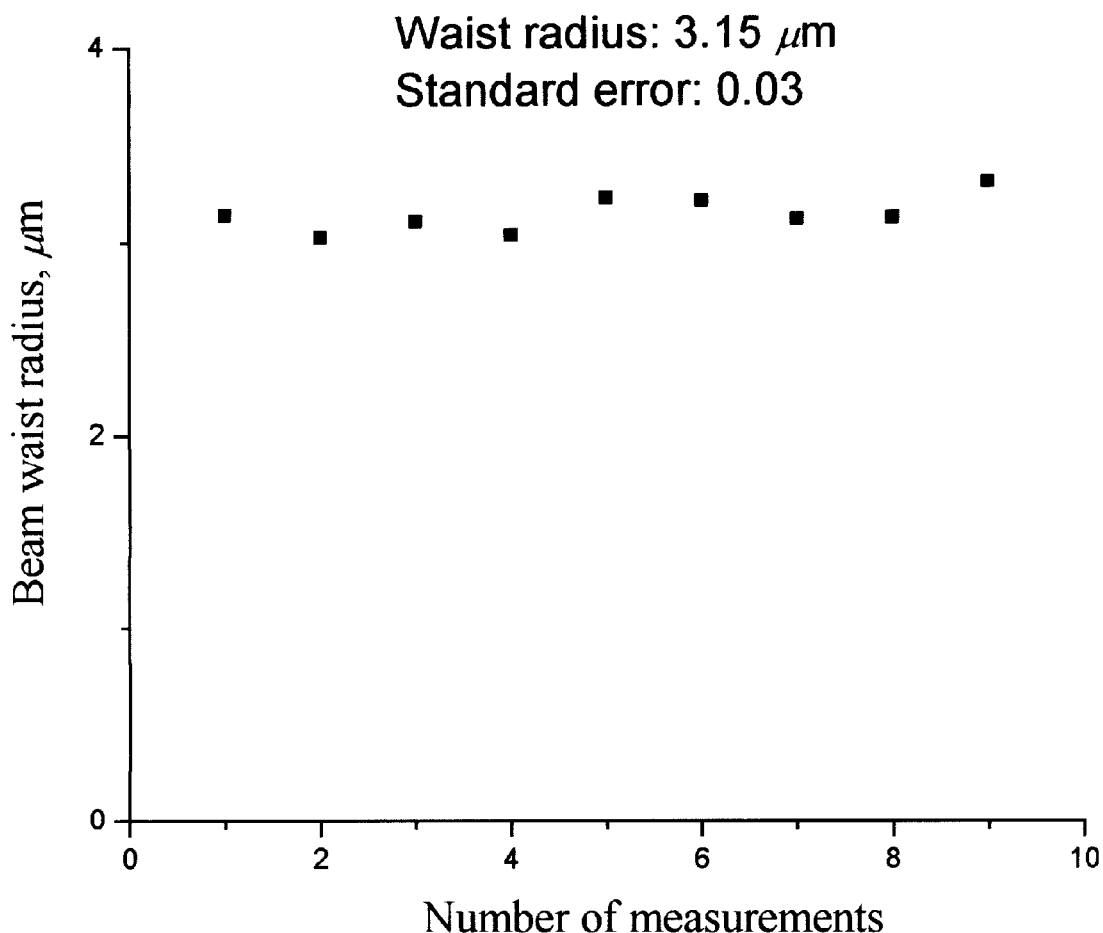
FIG. 5 shows the results of 9 test measurements of a beam waist radius of 3.15 μm. The standard error is 0.03.

The operation of the prototype laser beam multimeter named "Crystal Scan" device was tested using a thin film of a liquid crystal material. It is scanned through the focal region of the beam with the aid of a linear motorized stage. Beam waist radius as small as 0.8 micrometers could be measured within few minutes of alignment and few seconds of measuring time. There is no limitation to the beam waist radius that could be measured with this method. The minimum beam waist radius we were able to measure was limited by our capability of focusing the beam into tighter spots. The waist radius is determined with high accuracy even with few measurements, FIG. 5. Measurement of the focus position for the given focusing lens allowed determination of the beam divergence as small as 0.1 mrad. Measurement of the amplitude of the peaks allowed determination of the peak power density.

For non-Gaussian beams, Crystal Scan allows determination of the beam quality parameter by just measuring the size of an unfocused beam W (typically, this size is given in the technical specifications of the laser) and relating it with the measured confocal parameter of the beam:

$$M^2 = \frac{W}{f}\sqrt{\pi \frac{z_R}{\lambda}} \quad (4)$$

Crystal-Scan is a breakthrough in laser beam characterization techniques due to its simplicity, small sizes and weight, precision and multi-functionality. It can be incorporated into many laser systems particularly, making possible effective control and maintenance of medical laser procedures. Crystal Scan is apparently the only device that allows spot size measurement of ultraviolet lasers.

The Crystal Scan and the method underlying it, in accordance with the present invention, offers, among others, the following advantages:

There are no practical limitations to the smallness of the waist radius of the laser beam to be measured;

The nonlinear optical material can run through the focus of the laser beam within a short time period, allowing very fast measurements;

The device allows measuring pulsed laser beams.

Crystal Scan is a multimeter which simultaneously measures several parameters characterizing focused laser beams.

The nonlinear optical materials which are used in Crystal Scan have small absorption and high damage threshold;

There are only few simple alignment procedures which make the device easy to be operated by a non-technical personal;

The technique can operate for laser beams in a wide spectrum of wavelengths.

The device can easily and inexpensively be manufactured.

Although the present invention has been described above by way of a preferred embodiment, this embodiment can be modified at will, within the scope of the appended claims, without departing from the spirit and nature of the subject invention. Examples of such modifications include using CCD camera instead of a photodetector and processing a video image instead of the one-dimensional signal of the photodetector.

What is claimed is:

1. An apparatus capable of simultaneous measurement of the radius of a focused laser beam, focus position, power, power density, divergence and quality of a laser beam comprising:

a nonlinear optical material;

means for holding said nonlinear optical material;

means for scanning said nonlinear optical material through the focal region of said laser beam at a constant speed;

detector means for receiving a portion of said laser beam and providing a signal according to the changes of the intensity of said laser beam resulting from scanning said nonlinear optical material through said focal region;

data acquisition and processing means connected to said detector means for receiving said signal, processing and outputting information about the waist size, position of the focus, power, power density, divergence and quality of said laser beam, its divergence, or only a selection of one or more of those parameters;

indicator means for providing visual information about the measured selection of laser beam parameters.

2. Apparatus as in claim 1 further comprising a lens for focusing the laser beam.

3. Apparatus as in claim 1, wherein said detector means is a CCD, a matrix of detectors or another technique that has the capability of acquiring and outputting the two-dimensional distribution of said laser beam for further processing.

4. Apparatus as in claim 1, wherein the scanning of said focal region of said laser beam is performed at a variable speed.

5. Apparatus as in claim 1 further comprising means for controlling the power and direction of said laser beam traversed through the nonlinear optical material on its path to the detector means.

6. Apparatus as in claim 1 wherein the nonlinear optical material is a liquid crystal, an organic photochromic fulgide, cytochrome C, an azo dye, a carbazole compound with a conjugated side chain and/or electron withdrawing groups, a phycobiliprotein, a fluorescent dye, a rhodopsin, bacteriorhodopsin, solid crystal, semiconducting material, ZnSe or an analog of any of said materials and their combination.

7. Apparatus as in claim 1 wherein the data acquisition and processing means allow inputting the wavelength of the laser beam, the constant of the optical nonlinearity of the material, and other control and calibration parameters required for outputting the values of the desired selection of the laser beam parameters being characterized.

8. Apparatus as in claim 1 further comprising a second detector means for measuring the transmission of the nonlinear optical material in the scan process.

9. A method for simultaneous measurement of the radius of a focused laser beam, focus position, power, power density, divergence and quality of a laser beam comprising:

(a) a nonlinear optical material;

(b) means for holding said nonlinear optical material;

(c) means for scanning said nonlinear optical material through the focal region of said laser beam at a constant speed;

(d) detector means for receiving a portion of said laser beam and providing a signal according to the changes of the intensity of said laser beam resulting from scanning said nonlinear optical material through said focal region;

(e) data acquisition and processing means connected to said detector means for receiving said signal, processing and outputting information about the waist size, position of the focus, power, power density, divergence and quality of the laser beam, or only a selection of one or more of those parameters;

(f) indicator means for providing visual information about the measured selection of laser beam parameters.

10. A method as in claim 9 further comprising a lens for focusing the laser beam.

11. A method as in claim 9, wherein said detector means is a CCD, a matrix of detectors or another technique that has the capability of acquiring and outputting the two-dimensional distribution of said laser beam for further processing.

12. A method as in claim 9, wherein the scanning of the focal region of said laser beam is performed at a variable speed.

13. A method as in claim 9 further comprising means for controlling the power and direction of said laser beam traversed through the nonlinear optical material on its path to the detector means.

14. A method as in claim 9 wherein the nonlinear optical material is a liquid crystal, an organic photochromic fulgide, cytochrome C, an azo dye, a carbazole compound with a conjugated side chain and/or electron withdrawing groups, a phycobiliprotein, a fluorescent dye, a rhodopsin, bacteriorhodopsin, solid crystal, semiconducting material, ZnSe or an analog of any of said materials and their combination.

15. A method as in claim 9 wherein the data acquisition and processing means allow inputting the wavelength of the laser beam, the constant of the optical nonlinearity of the material, and other control and calibration parameters required for outputting the values of the desired selection of the laser beam parameters being characterized.

16. A method as in claims 9 further comprising detector means for measuring the transmission of the nonlinear optical material in the scan process.

* * * * *